US008432343B2

(12) United States Patent
Hong

(10) Patent No.: US 8,432,343 B2
(45) Date of Patent: Apr. 30, 2013

(54) LIQUID CRYSTAL DISPLAY DEVICE AND DRIVING METHOD THEREOF

(75) Inventor: Young Gi Hong, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 1063 days.

(21) Appl. No.: 11/984,936

(22) Filed: Nov. 26, 2007

(65) Prior Publication Data

US 2008/0150860 A1 Jun. 26, 2008

(30) Foreign Application Priority Data

Nov. 29, 2006 (KR) ........................ 10-2006-0118948

(51) Int. Cl.
*G09G 3/36* (2006.01)
*G06F 3/038* (2006.01)

(52) U.S. Cl.
USPC ............................................ 345/87; 345/204

(58) Field of Classification Search ............. 345/87–104
See application file for complete search history.

(56) References Cited

U.S. PATENT DOCUMENTS 5,945,970 A * 8/1999 Moon et al. ..................... 345/92
6,940,479 B2 * 9/2005 Kanbe et al. ..................... 345/87
2005/0134545 A1 * 6/2005 Jang et al. ..................... 345/100

FOREIGN PATENT DOCUMENTS

KR 10-1998-0039369 A 8/1998
KR 10-1998-0042727 A 8/1998

OTHER PUBLICATIONS

Office Action issued in counterpart Korean Patent Application No. 10-2006-0118948 dated Nov. 20, 2012.

* cited by examiner

*Primary Examiner* — Alexander Eisen
*Assistant Examiner* — Mark Regn
(74) *Attorney, Agent, or Firm* — Morgan, Lewis & Bockius LLP

(57) ABSTRACT

A liquid crystal display device and driving method thereof is disclosed, which is capable of removing afterimages from a screen when a power source is turned-off, the liquid crystal display device comprising a liquid crystal panel including a plurality of pixels defined by a plurality of gate and data lines crossing each other; a gate driver for driving the gate lines; a data driver for charging the pixels with analog video signals through the data lines; and a discharging unit for discharging voltage from the pixels by controlling the output of gate driver to make all the gate lines being divisionally driven or to make all the gate lines being driven at the same time when a power source is turned-off.

6 Claims, 9 Drawing Sheets

| Vcc | output from previous stage | output from discharging part |
|---|---|---|
| High | High | High |
| High | Low | Low |
| Low | High | High |
| Low | Low | High |

LIQUID CRYSTAL DISPLAY DEVICE AND DRIVING METHOD THEREOF

This application claims the benefit of Korean Patent Application No. 2006-118948 filed Nov. 29, 2006, which is hereby incorporated by reference as if fully set forth herein.

BACKGROUND OF THE INVENTION

1. Field of the Invention

The present invention relates to a liquid crystal display device and driving method thereof, and more particularly, to a liquid crystal display device capable of removing afterimages from a screen when a power source is turned-off, and a driving method thereof.

2. Discussion of the Related Art

Generally, a liquid crystal display device can display images by controlling light transmittance of liquid crystal with an electric field applied thereto. For this, the liquid crystal display device is comprised of a liquid crystal panel including a plurality of pixels arranged in a matrix configuration; and a driving circuit for driving the liquid crystal panel.

The liquid crystal panel includes a thin film transistor formed adjacent to each crossing of gate and data lines, and the pixel connected to the thin film transistor.

The thin film transistor is provided with a gate electrode and a source electrode, wherein the gate electrode is connected to any one of gate lines in a horizontal line unit, and the source electrode is connected to any one of data lines in a vertical line unit. The thin film transistor supplies a data signal from the data line to the pixel in response to a gate-driving pulse from the gate line.

The pixel is comprised of a pixel electrode connected to a drain electrode of the thin film transistor, and a common electrode facing the pixel electrode with the liquid crystal interposed therebetween. The pixel drives the liquid crystal in response to the data signal supplied to the pixel electrode, thereby controlling the light transmittance.

Hereinafter, a related art liquid crystal display device will be described with reference to the accompanying drawings.

FIG. 1 is an equivalent circuit diagram illustrating one pixel of a liquid crystal display device according to the related art.

As shown in FIG. 1, each of pixels included in a liquid crystal display device is defined by gate and data lines GL and DL crossing each other. Each pixel is provided with a thin film transistor TFT and a pixel electrode. In more detail, the thin film transistor TFT is formed adjacent to each crossing of the gate and data lines GL and DL. The thin film transistor TFT is provided with a gate terminal connected to the gate line GL, a source terminal connected to the data line DL, and a drain terminal connected to the pixel electrode.

The liquid crystal display device includes two facing glass substrate bonded to each other, and a liquid crystal layer formed between the two glass substrates. FIG. 1 shows one pixel formed on the lower glass substrate of liquid crystal display device, that is, first substrate including a thin film transistor array.

Although not shown, the upper glass substrate is provided in opposite to the lower glass substrate, that is, second substrate including R, G and B color filter layers and a common electrode 150 to display images. At this time, the pixel electrode on the first substrate is provided in opposite to the common electrode 150 on the second substrate with the liquid crystal layer interposed therebetween. The light transmittance of liquid crystal layer is controlled based on an intensity of electric field generated between the pixel electrode and the common electrode. In this case, the facing pixel and common electrodes 160 and 150 with the liquid crystal layer interposed therebetween function as a liquid crystal capacitor Clc using the liquid crystal layer as a dielectric.

Each pixel electrode included in each pixel is partially overlapped with the gate line G1 for driving the adjacent pixel. At this time, the pixel electrode and gate line GL facing each other function as an auxiliary capacitor Cst using an insulator as a dielectric. Generally, as described above, the pixel electrode included in each of the pixels overlaps with the gate line GL of the adjacent pixel, which is referred to as a previous gate structure.

An operation of the pixel will be explained as follows.

First, when the thin film transistor TFT is turned-on according to a gate high-voltage applied to the gate line GL, the liquid crystal capacitor Clc and the auxiliary capacitor Cst receives the voltage from the data line DL through the source and drain terminals of the thin film transistor TFT turned-on, thereby representing gray scales. Then, a gate low-voltage is applied to the gate line GL, so that the thin film transistor TFT is turned-off. According as the thin film transistor TFT is turned-off by the gate low-voltage, the display of gray scale is stably maintained by the electric charges charged to the auxiliary capacitor Cst during one frame.

When a power is turned-off from the liquid crystal display device, afterimages occur for a short period of time. Specifically, electric charges slowly disappear from pixel cells when the power is turned off causing the afterimages to appear on the display panel of the liquid crystal display device.

SUMMARY OF THE INVENTION

Accordingly, the present invention is directed to a liquid crystal display device and driving method thereof that substantially obviates one or more problems due to limitations and disadvantages of the related art.

An object of the present invention is to provide a liquid crystal display device capable of removing afterimages from a screen when a power source is turned-off, and a driving method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises a liquid crystal panel including a plurality of pixels defined by a plurality of gate and data lines crossing each other; a gate driver for driving the gate lines; a data driver for charging the pixels with analog video signals through the data lines; and a discharging unit for discharging voltage from the pixels by controlling the output of gate driver to make all the gate lines being divisionally driven or to make all the gate lines being driven at the same time when a power source is turned-off.

At this time, the gate driver includes a plurality of stages for driving the respective gate lines by using at least any one of a plurality of clock pulses provided with phase differences.

The liquid crystal display device further includes a delaying unit for delaying the power source based on RC time constants of resistor and capacitor; and a clock generating unit for generating the plurality of clock pulses by using an output signal from the delaying unit.

Also, the discharging unit includes one discharging part connected to all the plurality of stages, or a plurality of discharging parts respectively connected to the plurality of stages, to enable all the stages at the same time when the power source is turned-off.

Also, the plurality of stages are enabled at the same time by the one discharging part or the plurality of discharging parts when the power source is turned-off, and are divisionally driven by the plurality of clock pulses to divisionally drive the gate lines by periods corresponding to the total number of clock pulses.

The discharging unit includes a plurality of discharging parts respectively connected to the plurality of stages so as to enable all the stages at the same time by using a gate start pulse for enabling the first stage among the plurality of stages or the output signal from the previous stage for enabling other stage among the plurality of stages, and the power source when the power source is turned-off.

The plurality of stages are enabled at the same time by the respective discharging parts when the power source is turned-off, and are divisionally driven by the plurality of clock pulses to divisionally drive the gate lines by periods corresponding to the total number of clock pulses.

Each of the discharging parts includes an inversion part which inverts a logic state of the gate start pulse or a logic state of the output signal from the previous stage; and a NAND gate which NAND-operates the output signal from the inversion part and the power source, and outputting the NAND-operated result to the corresponding stage.

Also, the discharging unit includes a plurality of discharging parts respectively connected to the plurality of stages so as to drive all the gate lines at the same time by using the output signal from each stage and the power source when the power source is turned-off.

Each of the discharging parts includes an inversion part which inverts a logic state of output signal from the stage; and a NAND gate which NAND-operates the logic state of output signal from the inversion part and the power source, and outputs the result to the corresponding gate line.

In another aspect of the present invention, a driving method of a liquid crystal display device including a liquid crystal panel provided with a plurality of pixels defined by a plurality of gate and data lines crossing each other, comprises displaying images by charging the pixels with analog video signals through the data lines in synchronization with driving of the gate lines by using a gate driver when a power source is turned-on; and discharging voltage from the pixels by divisionally driving the gate lines or driving the gate lines at the same time in synchronization with controlling the output of the gate driver when the power source is turned-off.

At this time, the gate driver drives each of the respective gate lines by using the plurality of stages supplied with at least one clock pulse among the plurality of clock pulses provided with phase differences.

Also, discharging the voltage from the pixels comprises delaying the power source according to RC time constants of resistor and capacitor; and generating the plurality of clock pulses by using the delayed power source.

Also, discharging the voltage from the pixels comprises enabling all the stages at the same time by using one discharging part connected to all the plurality of discharging parts or the plurality of stages respectively connected to the plurality of stages when the power source is turned-off; and divisionally driving the gate lines by periods corresponding to the total number of clock pulses with the division-driving for the plurality of stages according to the plurality of clock pulses.

Also, discharging the voltage from the pixels comprises enabling all the stages at the same time according to the gate start pulse for enabling the first stage among the plurality of stages or the output signal from the previous stage for enabling other stage among the plurality of stages, and the power source by using the plurality of discharging parts respectively connected to the plurality of stages when the power source is turned-off; and divisionally driving the gate lines by periods corresponding to the total number of clock pulses with the division-driving for the plurality of stages according to the plurality of clock pulses.

Also, enabling all the stages at the same time comprises inverting a logic state of gate start pulse or a logic state of output signal from the previous stage by using an inversion part; and NAND-operating the output signal from the inversion part and the power source, and outputting the NAND-operated result to the corresponding stage.

Also, discharging the voltage from the pixels comprises driving all the gate lines at the same time according to the output signal from each stage and the power source by using the plurality of discharging parts respectively connected to the plurality of stages when the power source is turned-off.

Also, the plurality of discharging parts invert the logic state of output signal from the stage by using the inversion part, and output the result obtained by NAND-operating the output signal from the inversion part and the power source to the corresponding gate line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a liquid crystal display device according to the present invention and a driving method thereof will be described with reference to the accompanying drawings.

Figure 1:
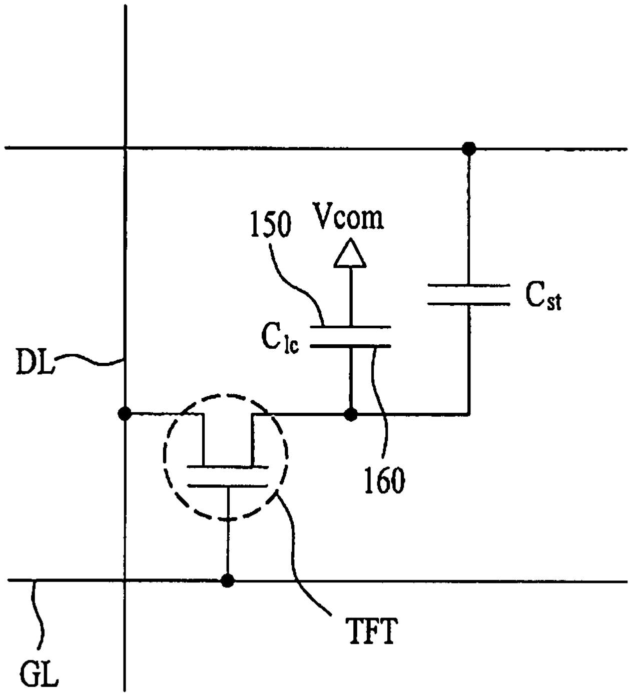
FIG. 1 Related Art
FIG. 1 is an equivalent circuit diagram illustrating one pixel of a liquid crystal display device according to the related art.
Figure 2:
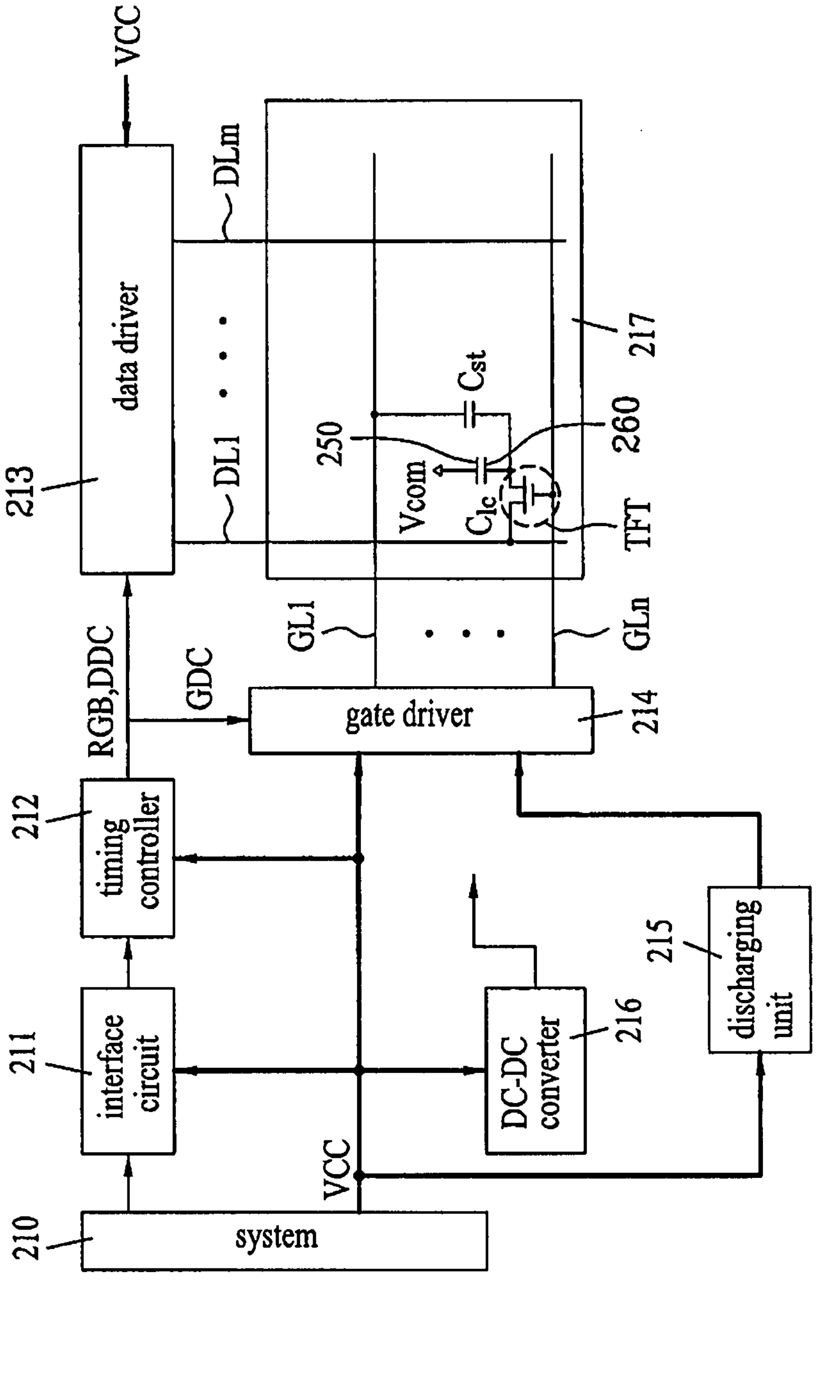
FIG. 2 is a block diagram illustrating a liquid crystal display device according to the preferred embodiment of the present invention.

FIG. 2 is a block diagram illustrating a liquid crystal display device according to the preferred embodiment of the present invention.

As shown in FIG. 2, the liquid crystal display device according to the preferred embodiment of the present invention is comprised of a liquid crystal panel 217 which includes 'm □n' pixels arranged in a matrix configuration and defined by crossing 'm' data lines DL1 to DLm and 'n' gate lines GL1 to GLn, and a plurality of thin film transistors TFT, each thin film transistor formed at each crossing of the gate and data lines; a data driver 213 which supplies a data voltage to the data line DL of the liquid crystal panel 217; a gate driver 214 which supplies a scan pulse comprised of a gate-off voltage VGL and a gate-on voltage VGH to the gate line GL of the liquid crystal panel 217; a timing controller 212 which controls the data driver 213 and the gate driver 214 by using a synchronizing signal supplied from an interface circuit 211; a DC-DC converter 216 which is supplied with a power-source voltage VCC from a system 210 and generates voltages supplied to the liquid crystal panel 217; and a discharging unit 215 which senses an operation state of the liquid crystal display device according to whether the power-source voltage VCC from the system 210 is turned-on/off, and controls an output of the gate driver 214 according to the operation state of the liquid crystal display device.

At this time, the system 210 supplies vertically/horizontally synchronized signals, clock signals and data RGB to the interface circuit 211 through a Low Voltage Differential Signaling LVDS transmitter included in a graphic controller, and also supplies the power-source voltage VCC of 3.3V generated from a power source to respective digital circuit devices 211, 212, 213, 214 and 215 and the DC-DC converter 216.

The respective pixels included in the liquid crystal panel 217 are defined by the plurality of gate lines GL1 to GLn and data lines DL1 to DLm crossing each other. Each of the pixels is provided with the thin film transistor TFT and a pixel electrode. In more detail, the thin film transistor TFT is formed at each crossing of the gate lines GL1 to GLn and data lines DL1 to DLm. The thin film transistor TFT includes a gate terminal connected to the gate line GL, a source terminal connected to the data line DL, and a drain terminal connected to the pixel electrode.

The liquid crystal panel 217 is comprised of two facing glass substrates bonded to each other; and a liquid crystal layer formed between the two glass substrates. FIG. 2 illustrates the lower glass substrate, that is, first substrate including a thin film transistor array.

Although not shown, there is the upper glass substrate corresponding to a second substrate which is opposite to the first substrate with the liquid crystal layer interposed therebetween. The second substrate includes R, G and B color filter layers and a common electrode 250 to display images. At this time, the pixel electrode 260 of the first substrate aforementioned is provided in opposite to the common electrode 250 of the second substrate with the liquid crystal layer interposed therebetween. At this time, a light transmittance of the liquid crystal is controlled based on an intensity of electric field generated between the pixel electrode 260 of the first substrate and the common electrode 250 of the second substrate. The pixel electrode 260 and the common electrode 250 facing each other with the liquid crystal layer interposed therebetween function as a liquid crystal capacitor Clc which uses the liquid crystal layer as a dielectric.

It is designed that some of the pixel electrode included in each of the pixels is overlapped with some of the gate line GL to drive the adjacent pixel. At this time, the facing pixel electrode and gate line GL function as an auxiliary capacitor Cst which uses an insulator as the dielectric. Generally, as described above, the pixel electrode included in each of the pixels overlaps with the gate line GL of the adjacent pixel, which is referred to as a previous gate structure. At this time, the auxiliary capacitor Cst may be formed by an overlap area between the pixel electrode and the gate line GL of the adjacent pixel.

At this time, the data driver 213 converts digital video data RGB into analog video signals corresponding to a gray scale value in response to a data control signal DDC from the timing controller 212, and supplies the analog video signals to the data line DL. Also, the power-source voltage VCC is supplied to a data driver integrated circuit into which the data driver 213 is integrated.

In the meantime, the gate driver 214 selects a horizontal line of the liquid crystal panel 217 supplied with the data voltage by sequentially supplying the scan pulse to the gate line GL in response to a gate control signal GDC supplied from the timing controller 212. Also, the power-source voltage VCC is supplied to a gate driver integrated circuit into which the gate driver 214 is integrated.

The timing controller 212 generates the gate control signal GDC to control the gate driver 214 and the data control signal DDC to control the data driver 213 by using the vertically/horizontally synchronized signals and the clock signals input from the graphic controller of the system 210 through the interface circuit 211.

The DC-DC converter 216 generates the voltage supplied to the liquid crystal panel 217 by raising or lowering the power-source voltage VCC output from the system 210 through a connector (not shown). For this, the DC-DC converter 216 includes an output switching device for switching an output voltage to an output terminal; and a pulse width modulator PWM and pulse frequency modulator PFM for raising or lowering the output voltage by controlling a duty ratio or frequency in a control signal of the output switching device. The pulse width modulator PWM raises the output voltage of the DC-DC converter 216 by raising the duty ratio in the control signal of the output switching device, or lowers the output voltage of the DC-DC converter 216 by lowering the duty ratio in the control signal of the output switching device.

Also, the pulse frequency modulator PFM raises the output voltage of the DC-DC converter 216 by raising the frequency in the control signal of the output switching device, or lowers the output voltage of the DC-DC converter 216 by lowering the frequency in the control signal of the output switching device.

At this time, the output voltage of the DC-DC converter 216 includes a reference voltage VDD above 6V, gamma reference voltages GMA1~10 provided 10 levels or less, a common voltage VCOM of 2.5~3.3V, a gate-on voltage VGH above 15V, and a gate-off voltage VGL below −4V. The gamma reference voltages GMA 1~10 are generated by dividing the reference voltage VDD.

The reference voltage VDD and the gamma reference voltages GMA1~10, which are gamma voltages for converting the digital video data RGB to the analog video signals corresponding to the gray scale value, are supplied to the data driver 213. Then, the common voltage VCOM is supplied to the common electrode 250 of the liquid crystal panel 217 through the data driver 213. At this time, the gate-on voltage VGH, which corresponds to a high-state voltage of the scan pulse set above a threshold voltage of the thin film transistor TFT, is supplied to the gate driver 214. Also, the gate-off voltage VGL, which corresponds to a low-state voltage of the scan pulse set as an off-voltage of the thin film transistor TFT, is supplied to the gate driver 214.

At this time, the gate driver will be explained in detail as follows.

Figure 3A:
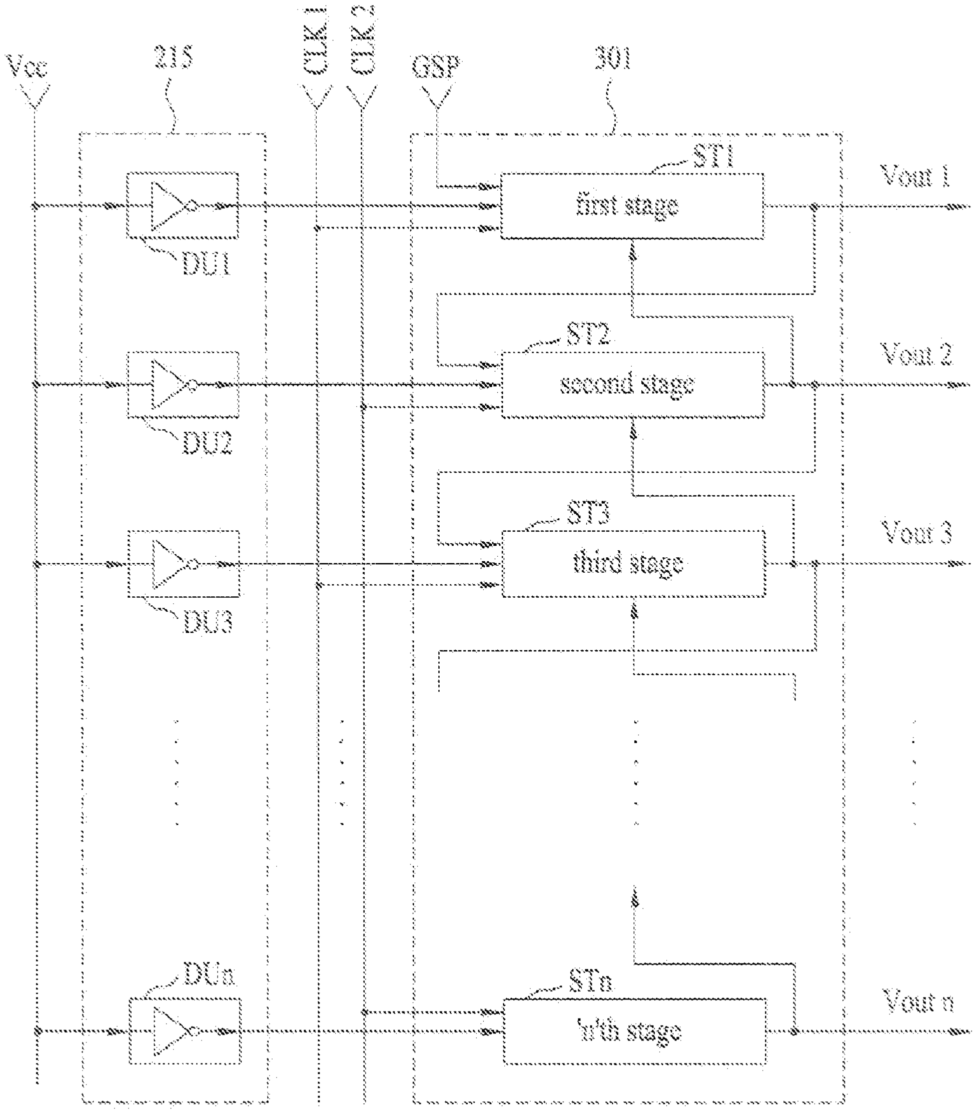
FIG. 3A is a block diagram illustrating a discharging unit and a shift register included in a gate driver according to the first embodiment of the present invention.
Figure 4:
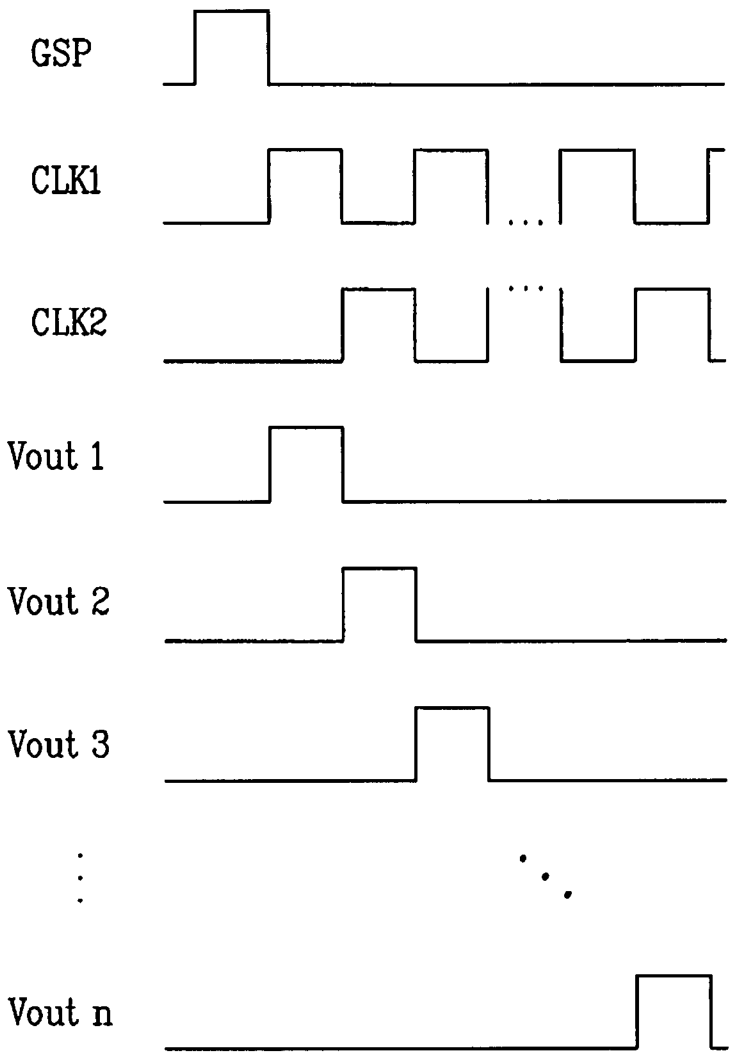
FIG. 4 is a waveform diagram illustrating a clock pulse supplied to shift register of FIGS. 3A and 3B.

FIG. 3A illustrates a discharging unit and a shift register included in a gate driver according to the first embodiment of the present invention. FIG. 4 illustrates a clock pulse supplied to a shift register of FIG. 3A.

As shown in FIG. 3A, a shift register 301 includes a plurality of stages ST1 to STn which output scan pulses by using at least two clock pulses provided with a phase difference.

The shift register 301 is supplied with at least two clock pulses provided with the phase difference. For convenience of explanation, supposing that the shift register 301 is supplied with first and second clock pulses CLK1 and CLK2 having the phase difference therebetween.

Each of the stages ST1 to STn is supplied with any one of the first and second clock pulses CLK1 and CLK2. For example, the '2k−1'th stage ('k' is an integer) is supplied with the first clock pulse CLK1, and the '2k'th stage is supplied with the second clock pulse CLK2.

Each of the stages ST1 to STn is enabled in response to the scan pulse output from the previous stage. In this enabled state, each of the stages ST1 to STn outputs the clock pulse supplied to itself as the scan pulse.

Each of the stages ST1 to STn is disabled in response to the scan pulse output from the next stage. In this disabled state, each of the stages ST1 to STn discharges the gate line GL1 to GLn by outputting a discharging power-source voltage.

Each of the stages ST1 to STn is supplied with two clock pulses, one of the clock pulses output as the scan pulse Vout 1 to Vout n, the other used to disable itself.

Among the stages ST1 to STn, the first stage ST1 for outputting the scan pulse firstly is enabled by a gate start pulse GSP.

Enabling the stage ST1 to STn means that the stage ST1 to STn is set to be in an output-enabling state. That is, the enabled stage ST1 to STn output the clock pulse supplied to itself.

Disabling the stage ST1 to STn means that the stage is reset to be in an output-disabling state. That is, the disabled stage ST1 to STn cannot output the clock pulse supplied to itself.

An operation of the shift register 301 will be explained as follows.

In an initial period, the first stage ST1 is enabled by the gate start pulse GSP.

In a first period, the first clock pulse CLK1 is supplied to the first stage ST1 being enabled. Accordingly, the first stage ST1 outputs the first clock pulse CLK1 as the first scan pulse Vout 1.

The first scan pulse Vout 1 is supplied to the first gate line GL1 and the second stage ST2. Accordingly, in the first period, the first gate line GL1 is driven and the second stage ST2 is enabled.

In a second period, the second clock pulse CLK2 is supplied to the second stage ST2 being enabled. Accordingly, the second stage ST2 outputs the second clock pulse CLK2 as the second scan pulse Vout 2.

The second scan pulse Vout 2 is supplied to the second gate line GL2, the third stage ST3 and the first stage ST 1. In the second period, the second gate line GL2 is driven, the third stage ST3 is enabled, and the first stage ST1 is disabled.

According to this method, the third to 'n'th stages ST3 to STn output the scan pulses Vout 3 to Vout n in sequence.

The respective stages ST1 to STn are enabled in sequence, and output the scan pulses Vout 1 to Vout n in sequence, whereby the gate lines GL1 to GLn are driven in sequence.

The discharging unit 215 is provided at one side of the stages ST1 to STn. The discharging unit 215 senses whether the power-source voltage VCC is turned-on/off, and operates as follows.

That is, the discharging unit 215 doesn't supply any signal to the respective stages ST1 to STn in the period of maintaining on-state of the power-source voltage VCC (power-source voltage VCC is maintained in a high state). Accordingly, in a normal driving period where the power-source voltage VCC is maintained in on-state, the respective stages ST1 to STn output the scan pulses Vout 1 to Vout n in sequence.

The discharging unit 215 outputs the control signal at a point of turning-off the power-source voltage VCC (power-source voltage VCC falls to the low state), and supplies this control signal to the stages ST1 to STn at the same time, whereby the stages ST1 to STn are enabled at the same time.

The enabled stages ST1 to STn are set to be in the output-enabling state, that is, the state suitable for outputting the scan pulses Vout 1 to Vout n. In this state, the '2k−1'th stages, that is, the odd numbered stages ST1, ST3, . . . , STn−1 supplied with the first clock pulse CLK1 output the first clock pulse CLK1 as the scan pulse Vout 1, Vout 3, . . . , Vout n−1.

The '2k'th stages, that is, the even numbered stages ST2, ST4, . . . , STn supplied with the second clock pulse CLK2 output the second clock pulse CLK2 as the scan pulse Vout 2, Vout 4, . . . , Vout n.

Accordingly, the odd numbered gate lines GL1, GL3, . . . , GLn−1 are charged with the high state at the same time. Then, the even numbered gate lines GL2, GL4, . . . . GLn are charged with the high state at the same time.

That is, all the gate lines GL1 to GLn are charged with the high state throughout the two periods. Thus, according as all the thin film transistors connected to the gate lines GL1 to GLn are turned-on, the voltage charged in all the pixels, that is, the voltage stored in the auxiliary capacitor Cst of all the pixels is discharged rapidly.

As the voltage of all the auxiliary capacitor Cst is immediately discharged at a moment of turning-off the power-source voltage VCC, it is possible to prevent afterimages from occurring on a screen.

The discharging unit 215 is provided with a plurality of discharging parts DU1 to Dun. The number of discharging parts DU1 to Dun is identical to the number of stages ST1 to STn, wherein each of the discharging parts DU1 to DUn controls each of the stages ST1 to Tn.

Figure 3B:
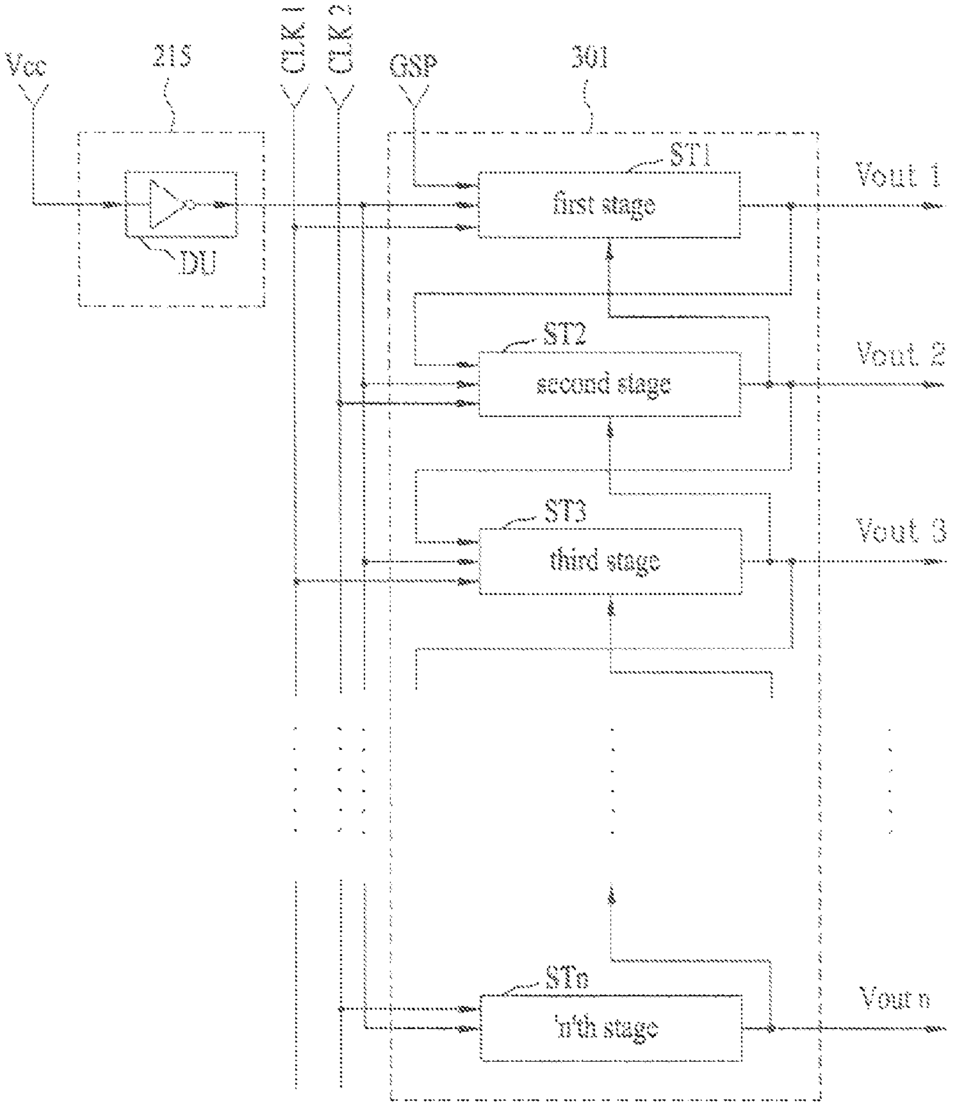
FIG. 3B is a block diagram illustrating another discharging unit.

As shown in FIG. 3B, the discharging unit 215 may be provided with one discharging part DU. In this case, one discharging part DU supplies the control signal to all the stages ST1 to STn at a moment of turning-off the power-source voltage VCC, so that the stages ST1 to STn are enabled at the same time.

In order to operate the stages ST1 to STn even after turning-off the power-source voltage VCC, a clock generating unit is maintained as an operation mode to generate the first and second clock pulses CLK1 and CLK2. For this, the clock generating unit is supplied with the power-source voltage VCC through a delaying unit.

Figure 5:
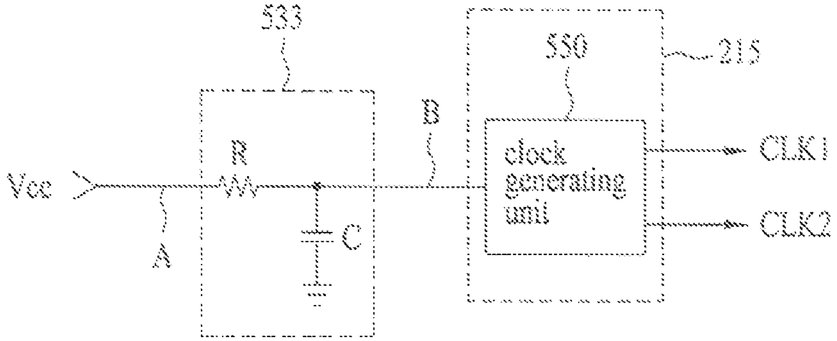
FIG. 5 is a diagram illustrating a delaying unit and a clock generating unit supplied with power through the delaying unit.
Figure 6:
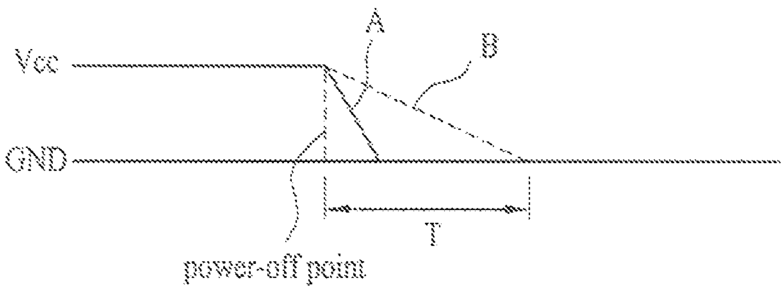
FIG. 6 is a diagram illustrating a comparison result between a state of power source before passing through a delaying unit and a state of power source after passing through the delaying unit.

FIG. 5 is a diagram illustrating a delaying unit and a clock generating unit supplied with power through the delaying unit. FIG. 6 is a diagram illustrating a comparison result between a state of power source before passing through a delaying unit and a state of power source after passing through the delaying unit.

As shown in FIG. 5, the clock generating unit 550 is supplied with the power-source voltage VCC passing through the delaying unit 533, thereby generating the first and second clock pulses CLK1 and CLK2.

The delaying unit 533 corresponds to a RC delaying circuit where a resistor is connected to a capacitor in parallel.

The power-source voltage VCC maintained as on-state corresponds to a D.C. power-source voltage VCC. During a normal operation period where the power-source voltage VCC is maintained as on-state, even though the power-source voltage VCC passes through the delaying unit 533, it is not influenced by the capacitor. As shown in FIG. 5, the level of power-source voltage VCC in 'A' point is identical to the level of power-source voltage VCC in 'B' point.

However, at a moment of turning-off the power-source voltage VCC, the power-source voltage VCC is changed to an alternating current power-source voltage VCC which falls to a low state from a high state. At this moment, the power-source voltage VCC is distorted by the resistor and capacitor included in the delaying unit 533. That is, the power-source voltage VCC of 'A' point falls to the ground rapidly, while the power-source voltage VCC of 'B' point is delayed by the time constant corresponding to the value of resistor and capacitor and falls to the ground slowly.

Accordingly, as shown in FIG. 6, even though the power-source voltage VCC is turned-off, the power-source voltage VCC of 'B' point is maintained as the high state by the discharging period T. As a result, the clock generating unit 550 is operated at the discharging period T. In other words, even in the discharging period T, the clock generating unit 550 generates and outputs the first and second clock pulses CLK1 and CLK2 as shown in FIG. 4. Then, the stages ST1 to STn supplied with the first and second clock pulses CLK1 and CLK2 output the scan pulses Vout 1 to Vout n, whereby the voltage is discharged from all the pixels (or auxiliary capacitors Cst) during the discharging period T.

Figure 7:
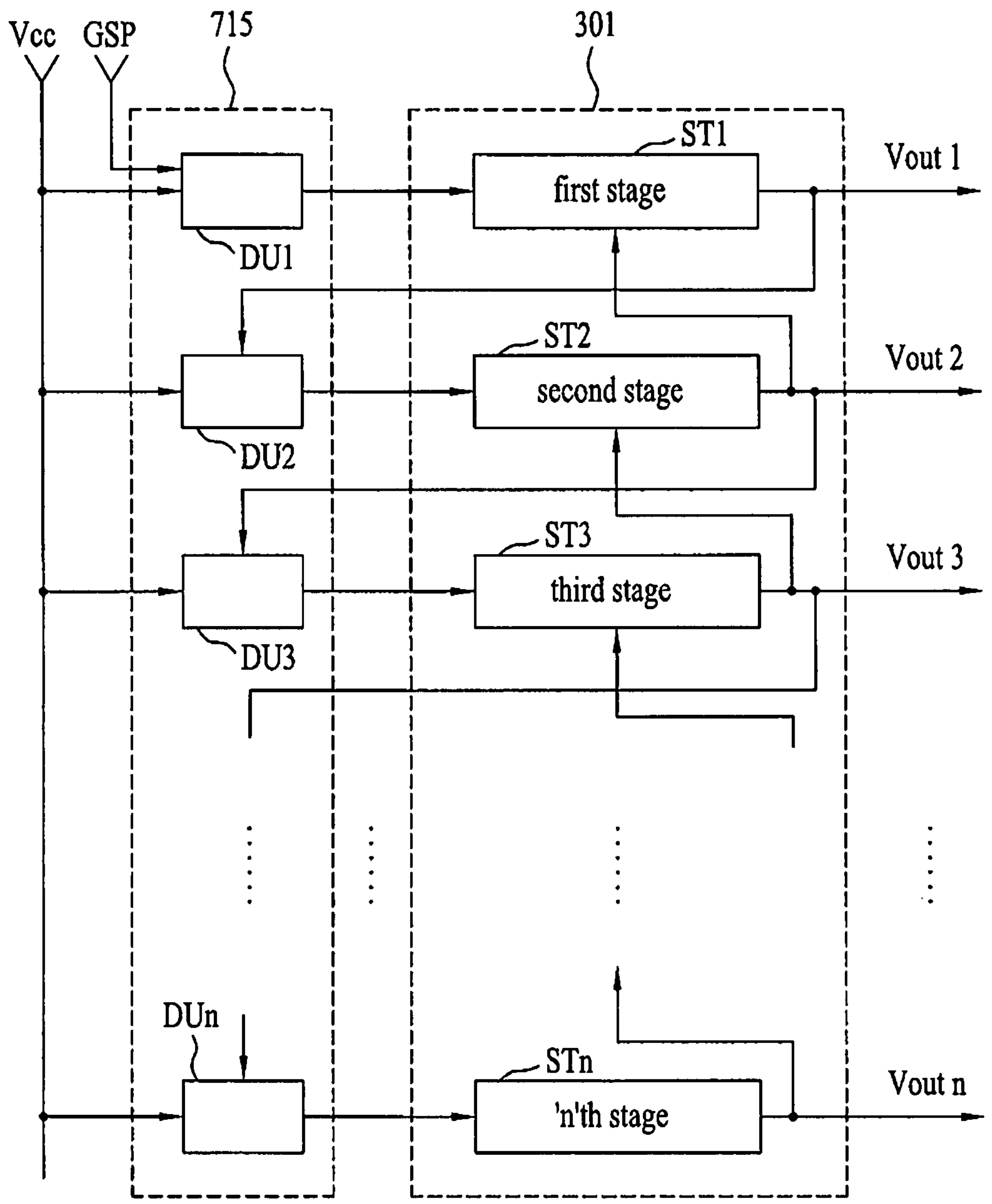
FIG. 7 is a block diagram illustrating a discharging unit and a shift register included in a gate driver according to the second embodiment of the present invention.
Figures 8, 9:
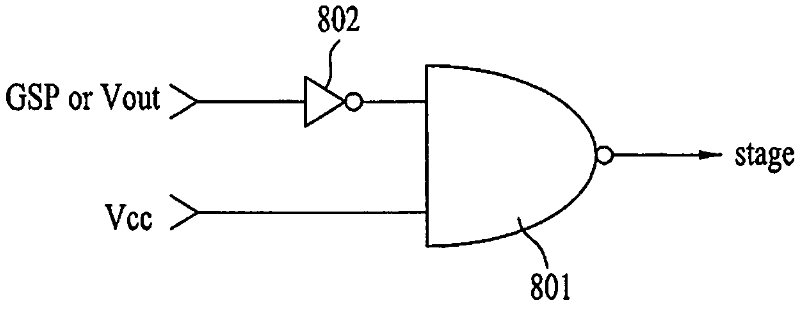
FIG. 8 is a diagram illustrating a discharging part shown in FIG. 7.
FIG. 9 is a logic table illustrating a logic state of output from a discharging part of FIG. 8.

FIG. 7 is a block diagram illustrating a discharging unit and a shift register included in a gate driver according to the second embodiment of the present invention. FIG. 8 is a diagram illustrating a discharging part shown in FIG. 7.

As shown in FIG. 7, the discharging unit according to the second embodiment of the present invention includes a plurality of discharging parts DU1 to Dun.

The discharging unit 715 senses whether a power-source voltage VCC is turned-on/off, and operates based on the sensed result as follows.

In a period of maintaining on-state of the power-source voltage VCC (period of maintaining a high state of the power-source voltage VCC), the discharging unit 715 supplies a gate start pulse or the output signal from the previous stage to the respective stages ST1 to STn without regard to the on-state of the power-source voltage VCC. In a normal driving period where the power-source voltage VCC is turned-on, the stages ST1 to STn output scan pulses Vout 1 to Vout n in sequence.

The discharging unit 715 outputs a control signal at a point of turning-off the power-source voltage VCC (at which the power-source voltage VCC falls to a low state), and supplies the control signal to the respective stages ST1 to STn at the same time, thereby enabling the stages ST1 to STn at the same time.

The discharging unit 715 includes a plurality of discharging parts DU1 to DUn. The number of discharging parts DU1 to DUn is identical to the number of stages ST1 to STn, wherein each of the discharging parts controls each of the stages.

Each of the discharging parts DU1 to DUn supplies the scan pulse of the previous stage to the corresponding stage ST1 to STn when the power-source voltage VCC is in on-state.

If the power-source voltage VCC is in off-state, each of the discharging parts DU1 to DUn enables the corresponding stage ST1 to STn without regard to the output of scan pulse from the previous stage.

For this, as shown in FIG. 8, each of the discharging parts DU1 to DUn includes an inversion part 802 which inverts a logic state of scan pulse from the previous stage; and a NAND (NOT-AND) gate 801 which logically combines the logic state of power-source voltage VCC with the logic state of scan pulse Vout 1 to Vout n from the inversion part 802, and outputs the logically combined one to the corresponding stage ST1 to STn.

Each of the stages ST1 to STn included in the shift register 301 is enabled in response to the scan pulse from the previous stage through each of the discharging parts DU1 to DUn.

FIG. 9 is a logic table illustrating the logic state of output from the discharging unit of FIG. 8.

As shown in FIG. 9, when the power-source voltage VCC is in on-state, that is, high state, the logic state of output from each of the discharging parts DU1 to DUn is determined based on the logic state of output from the previous stage ST1 to STn (or logic state of gate start pulse GSP).

If the power-source voltage VCC is in off-state, that is, low state, the logic state of output from each of the discharging parts DU1 to DUn is not influenced by the logic state of output from the previous stage. That is, when the power-source voltage VCC is in off-state, all the discharging parts DU1 to DUn generate the output (control signal) of high state.

All the stages ST1 to STn are enabled in response to this control signal at the same time.

Thus, all the enabled stages ST1 to STn are set to be in the output-enabling state suitable for outputting the scan pulses Vout 1 to Vout n. In this state, the '2k−1'th stages supplied with the first clock pulse CLK1, that is, the odd-numbered stages ST1, ST3, . . . . STn−1 output the first clock pulse CLK1 as the scan pulse Vout 1, Vout 3, . . . , Vout n−1 at the same time.

After that, the '2k'th stages supplied with the second clock pulse CLK2, that is, the even-numbered stages ST2, ST4, . . . , STn output the second clock pulse CLK2 as the scan pulses Vout 2, Vout 4, . . . , Vout n at the same time.

Accordingly, the odd-numbered gate lines GL1, GL3, . . . , GLn−1 are charged with the high state at the same time, and then the even-numbered gate lines GL2, GL4, . . . , GLn are charged with the high state at the same time.

That is, all the gate lines GL1 to GLn are charged with the high state throughout the two periods. Accordingly, the thin film transistors connected to all the gate lines GL to GLn are turned-on, whereby the voltage is rapidly discharged from auxiliary capacitors Cst included, in all pixels, thereby preventing afterimages from occurring on a screen.

Figure 10:
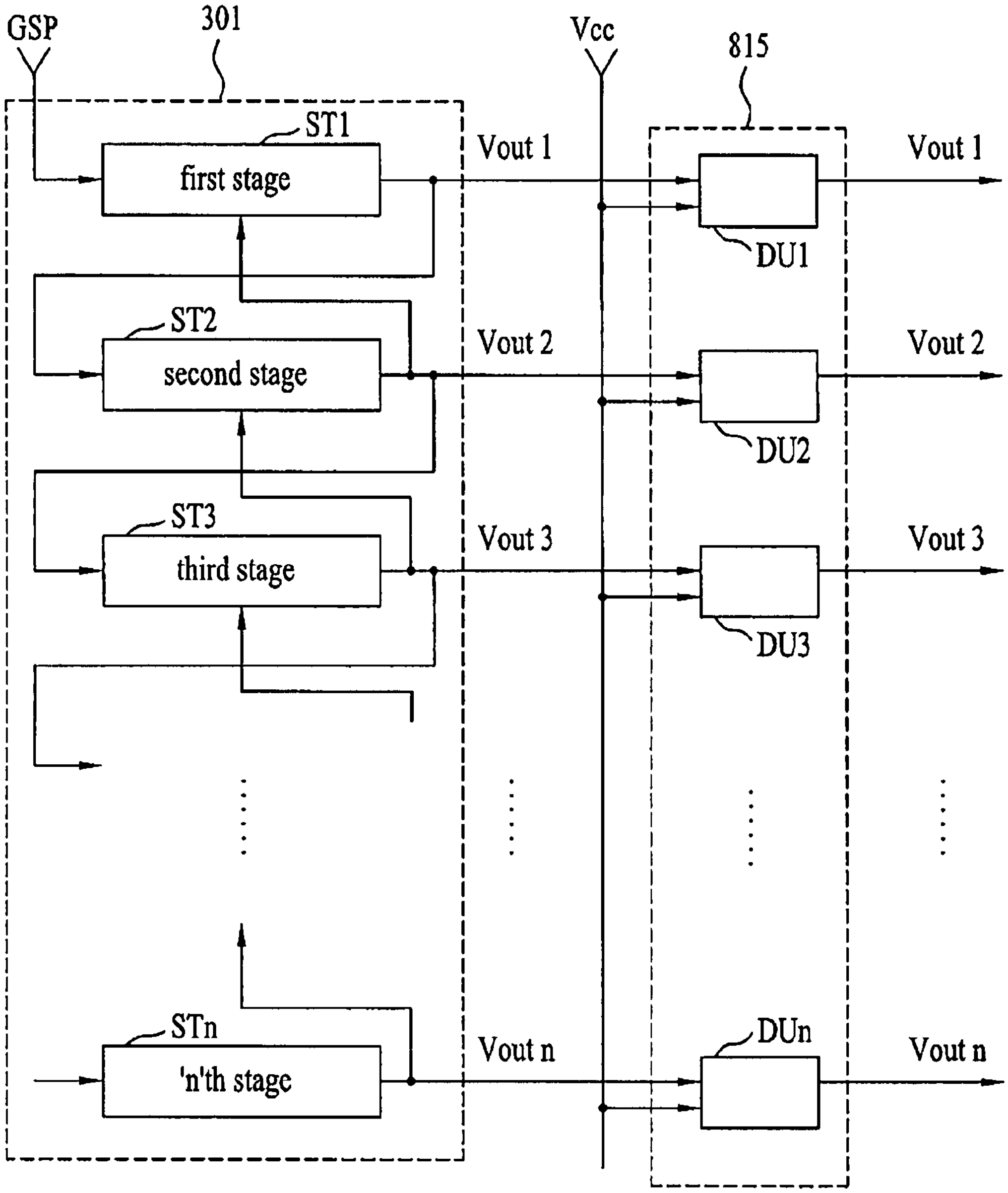
FIG. 10 is a block diagram illustrating a discharging unit and a shift register included in a gate driver according to the third embodiment of the present invention.

FIG. 10 is a diagram illustrating a discharging unit and a shift register included in a gate driver according to the third embodiment of the present invention.

As shown in FIG. 10, the discharging unit 815 according to the third embodiment of the present invention is positioned at an output terminal of the shift register 301.

At this time, scan pulses Vout 1 to Vout n from the shift register 301 are supplied to gate lines GL1 to GLn through the discharging unit 815. At this time, the discharging unit 815 senses whether the power-source voltage VCC is turned-on/off. Based on the sensed result, the discharging unit 815 determines whether scan pulses Vout 1 to Vout n are output or not.

That is, if the power-source voltage VCC is turned-on, the discharging unit 815 supplies the scan pulse Vout 1 to Vout n from the shift register 301 to gate lines GL1 to GLn. When the power-source voltage VCC is turned-off, the discharging unit 815 supplies the charging voltage to all the gate lines GL1 to GLn at the same time without regard to a logic state of scan pulse Vout 1 to Vout n from the shift register 301.

Accordingly, all auxiliary capacitors Cst included in pixels are discharged at a moment of turning-off the power-source voltage VCC.

The discharging unit 815 includes a plurality of discharging parts DU1 to DUn. The number of discharging parts DU1 to DUn is identical to the number of stages ST1 to STn, wherein each of the discharging parts controls each of the stages.

Except that a gate start signal is supplied to the first gate line, each of the discharging parts DU1 to DUn is identical in circuit structure to that of FIG. 8.

As mentioned above, the liquid crystal display device according to the present invention and the driving method thereof has the following advantages.

In the liquid crystal display device according to the present invention, all the gate lines are driven at the same time during at least two periods when the power source of system is turned-off, whereby the voltage is discharged from the pixels connected to the respective gate lines included in the liquid crystal panel, thereby preventing the afterimages from occurring on the screen when turning-off the power source.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:

a liquid crystal panel including a plurality of pixels defined by a plurality of gate and data lines crossing each other;

a gate driver for driving the gate lines;

a data driver for charging the pixels with analog video signals through the data lines; and a discharging unit for discharging voltage from the pixels by controlling the output of gate driver to make all the gate lines being divisionally driven or to make all the gate lines being driven at the same time when a power source is turned-off, wherein the gate driver includes a plurality of stages for driving the respective gate lines by using at least any one of a plurality of clock pulses provided with phase differences, wherein each of the plurality of stages output one of plurality of clock pulses as a scan pulse of the corresponding gate line, wherein the discharging unit includes a plurality of discharging parts respectively connected to input terminals of the plurality of stages and inputs a gate start pulse, the output signals from the plurality of stages, and a power source voltage, wherein each of the plurality of discharging parts logically combines a first input signal and a second input signal to provide the corresponding stage with a control signal which enables the corresponding stage when the power source is turned-on and turned-off, wherein the first input signal is a signal which is the inverted gate start pulse or the output signal from the previous stage and the second input signal is the power source voltage, wherein when the power source is turned-on, each the plurality of discharging parts provide the corresponding stage with the control signal, which corresponds to the gate start pulse or the output signal from the previous stage, so that the plurality of stages are enabled sequentially, and wherein when the power source is turned-off, each of the plurality of discharging parts provide the corresponding stage with the control signal so that all the plurality of stages are enabled at the same time, and wherein when the power-source voltage is turned-off, odd stages of the plurality of stages output a first clock pulse as the scan pulse of the corresponding odd gate lines and even stages of the plurality of stages output a second clock pulse as the scan pulse of the corresponding even gate lines, wherein when the power source is turned-on, the first and second clock pulse are used for driving the plurality of stages.

2. The liquid crystal display device of claim 1, wherein each of the discharging parts includes an inversion part which inverts a logic state of the gate start pulse or a logic state of the output signal from the previous stage; and a NAND gate which NAND-operates the output signal from the inversion part and the power source, and outputting the NAND-operated result to the corresponding stage.

3. The liquid crystal display device of claim 1, further comprising:

a delaying unit delaying the power source based on RC time constants of resistor and capacitor; and a clock generating unit generating the plurality of clock pulses by using an output signal from the delaying unit and providing the gate driver with the clock pulses.

4. A driving method of a liquid crystal display device including a liquid crystal panel provided with a plurality of pixels defined by a plurality of gate and data lines crossing each other, comprising:

displaying images by charging the pixels with analog video signals through the data lines in synchronization with driving of the gate lines by using a gate driver when a power source is turned-on; and discharging voltage from the pixels by divisionally driving the gate lines or driving the gate lines at the same time in synchronization with controlling the output of the gate driver by using a discharging unit when the power source is turned-off, wherein the gate driver drives each of the respective gate lines by using the plurality of stages supplied with at least one clock pulse among the plurality of clock pulses provided with phase differences, wherein each of the plurality of stages output one of plurality of clock pulses as a scan pulse of the corresponding gate line, wherein the discharging unit includes a plurality of discharging parts respectively connected to input terminals of the plurality of stages and inputs a gate start pulse, the output signals from the plurality of stages, and a power source voltage, wherein each of the plurality of discharging parts logically combines a first input signal and a second input signal to provide the corresponding stage with a control signal which enables the corresponding stage when the power source is turned-on and turned-off, wherein the first input signal is a signal which is the inverted gate start pulse or the output signal from the previous stage and the second input signal is the power source voltage, wherein when the power source is turned-on, each the plurality of discharging parts provide the corresponding stage with the control signal, which corresponds to the gate start pulse or the output signal from the previous stage, so that the plurality of stages are enabled sequentially, and wherein when the power source is turned-off, each of the plurality of discharging parts provide the corresponding stage with the control signal so that all the plurality of stages are enabled at the same time, and wherein when the power-source voltage is turned-off, odd stages of the plurality of stages output a first clock pulse as the scan pulse of the corresponding odd gate lines and even stages of the plurality of stages output a second clock pulse as the scan pulse of the corresponding even gate lines, wherein when the power source is turned-on, the first and second clock pulse are used for driving the plurality of stages.

5. The driving method of claim 4, wherein enabling all the stages at the same time comprises:

inverting a logic state of the gate start pulse or a logic state of the output signal from the previous stage by using an inversion part; and NAND-operating the output signal from the inversion part and the power source, and outputting the NAND-operated result to the corresponding stage.

6. The driving method of claim 4, further comprising:

delaying the power source based on RC time constants of resistor and capacitor; and generating the plurality of clock pulses by using an output signal from the delaying unit and providing the gate driver with the clock pulses.

* * * * *